(12) United States Patent
Kim et al.

(10) Patent No.: US 11,314,361 B2
(45) Date of Patent: Apr. 26, 2022

(54) TOUCH APPARATUS AND TOUCH DETECTION METHOD THEREOF

(71) Applicant: HiDeep Inc., Seongnam-si (KR)

(72) Inventors: Seyeob Kim, Seongnam-si (KR);
Hwanhee Lee, Seongnam-si (KR);
Jongsik Kim, Seongnam-si (KR);
Jeongwon Seo, Seongnam-si (KR);
Hyoungwook Woo, Seongnam-si (KR);
Kiryoung Jung, Seongnam-si (KR);
Bonkee Kim, Seongnam-si (KR)

(73) Assignee: HIDEEP INC., Seongnam-si (KR)

( * ) Notice: Subject to any disclaimer, the term of this patent is extended or adjusted under 35 U.S.C. 154(b) by 0 days.

(21) Appl. No.: 17/113,652

(22) Filed: Dec. 7, 2020

(65) Prior Publication Data

US 2021/0311590 A1    Oct. 7, 2021

(30) Foreign Application Priority Data

Apr. 7, 2020 (KR) .................. 10-2020-0041935

(51) Int. Cl.
*G06F 3/044* (2006.01)
*G06F 3/041* (2006.01)

(52) U.S. Cl.
CPC .......... *G06F 3/0445* (2019.05); *G06F 3/0416* (2013.01); *G06F 3/0441* (2019.05)

(58) Field of Classification Search
CPC ...... G06F 3/044; G06F 3/0412; G06F 3/0446; G06F 3/041; G06F 3/0416; G06F 2203/04103; G06F 3/0445; G06F 3/0443
See application file for complete search history.

(56) References Cited

U.S. PATENT DOCUMENTS

| 2007/0109274 A1* | 5/2007 | Reynolds | ............ G06F 3/04182 345/173 |
| 2010/0073323 A1* | 3/2010 | Geaghan | ............... G06F 3/0446 345/174 |

(Continued)

FOREIGN PATENT DOCUMENTS

| KR | 10-2000-0016918 | 3/2000 |
| KR | 10-2015-0001323 | 1/2015 |

(Continued)

OTHER PUBLICATIONS

KIPO, PCT Search Report & Written Opinion of PCT/KR2020/017760 dated Mar. 31, 2021.

(Continued)

*Primary Examiner* — Olga V Merkoulova
(74) *Attorney, Agent, or Firm* — Lex IP Meister, PLLC

(57) ABSTRACT

A touch apparatus according to an exemplary embodiment includes: a touch panel that includes a plurality of first touch electrodes extending in a first direction and arranged in a second direction that crosses the first direction, and a plurality of second touch electrodes extending in the second direction and arranged in the first direction; and a touch driver that applies a first driving signal for generation of a resonance signal of a stylus pen to the touch panel in a first section, and receives a detection signal from the plurality of first touch electrodes and the plurality of second touch electrodes in a second section that is next to the first section.

18 Claims, 19 Drawing Sheets

(56) References Cited

U.S. PATENT DOCUMENTS

| | | | | |
|---|---|---|---|---|
| 2011/0063229 | A1* | 3/2011 | Krah | G06F 3/04182 |
| | | | | 345/173 |
| 2011/0063993 | A1* | 3/2011 | Wilson | H04M 11/062 |
| | | | | 370/254 |
| 2014/0078101 | A1* | 3/2014 | Katsurahira | G06F 3/04182 |
| | | | | 345/174 |
| 2014/0085246 | A1* | 3/2014 | Shahparnia | G06F 3/0443 |
| | | | | 345/174 |
| 2017/0090624 | A1* | 3/2017 | Kwon | G06F 1/3296 |
| 2018/0181229 | A1* | 6/2018 | Kwon | G06F 3/0418 |
| 2019/0196642 | A1* | 6/2019 | Kong | G06F 3/0418 |
| 2019/0391681 | A1* | 12/2019 | Hekmatshoartabari | |
| | | | | G06F 3/046 |

FOREIGN PATENT DOCUMENTS

| | | |
|---|---|---|
| KR | 10-2015-0050799 | 5/2015 |
| KR | 10-2016-0025443 | 3/2016 |
| KR | 10-2020-0005874 | 1/2020 |
| KR | 10-2020-0063681 | 6/2020 |

OTHER PUBLICATIONS

Kyung-Hoon Lee et al., "A Noise-Immune Stylus Analog Front-End Using Adjustable Frequency Modulation and Linear-Interpolating Data Reconstruction for Both Electrically Coupled Resonance and Active Styluses", ISSCC 2018 ECR, Feb. 13, 2018.

* cited by examiner

TOUCH APPARATUS AND TOUCH DETECTION METHOD THEREOF

CROSS-REFERENCE TO RELATED APPLICATION

This application claims priority to and the benefit of Korean Patent Application No. 10-2020-0041935 filed in the Korean Intellectual Property Office on Apr. 7, 2020, the entire contents of which are incorporated herein by reference.

BACKGROUND OF THE INVENTION

(a) Field of the Invention

The present disclosure relates to a touch apparatus and a touch detection method of the touch apparatus. More particularly, the present invention relates to a touch apparatus for detecting a touch by a stylus pen, and a touch detection method of the touch apparatus.

(b) Description of the Related Art

Various terminals such as a mobile phone, a smart phone, a tablet PC, a laptop computer, a digital broadcasting terminal, a personal digital assistant (PDA), a portable multimedia player (PMP), a navigator, and the like are provided with a touch sensor.

In such a terminal, the touch sensor may be located on a display panel where an image is displayed, or may be disposed in one region of a terminal body. As a user interacts with the terminal by touching the touch sensor, the terminal can provide an intuitive user interface to the user.

The user may use a stylus pen for sophisticated touch input. Such a stylus pen can transmit and receive signals through a touch sensor using an electrical and/or magnetic method.

The above information disclosed in this Background section is only for enhancement of understanding of the background of the invention, and therefore it may contain information that does not form the prior art that is already known in this country to a person of ordinary skill in the art.

SUMMARY OF THE INVENTION

Technical Problem

Exemplary embodiments provide a touch apparatus that can acquire a touched position within a short period of time, and a touch detection method of the touch apparatus.

Exemplary embodiments also provide a touch apparatus that can improve a signal to noise ratio of an effective signal used in touched coordinates detection, and a touch detection method of the touch apparatus.

Technical Solution

In order to achieve the above-stated or other purposes, a touch apparatus according to an exemplary embodiment includes: a touch panel that includes a plurality of first touch electrodes extending in a first direction and arranged in a second direction that crosses the first direction, and a plurality of second touch electrodes extending in the second direction and arranged in the first direction; and a touch driver that applies a first driving signal for generation of a resonance signal of a stylus pen to the touch panel in a first section, and receives a detection signal from the plurality of first touch electrodes and the plurality of second touch electrodes in a second section that is next to the first section.

The touch driver may apply a driving signal of which a ratio of a disable level section with respect to an enable level section within one iterative period is different from that of the first driving signal in the second section, to at least one type of the plurality of first touch electrodes and the plurality of second touch electrodes.

The touch driver may receive the detection signal when the driving signal applied to the at least one type of the plurality of first touch electrodes and the plurality of second touch electrodes is in the disable level section in the second section.

The touch driver may receive detection signals from the plurality of second touch electrodes when a driving signal applied to the plurality of first touch electrodes has a disable level in the second section, and may receive detection signals from the plurality of first touch electrodes when a driving signal applied to the plurality of second touch electrodes has a disable level in the second section.

The touch driver may receive detection signals from the plurality of second touch electrodes when the driving signal has the disable level for a 2-1 section during which the driving signal is applied only to the plurality of first touch electrodes in the second section, and may receive detection signals from the plurality of second touch electrodes when the driving signal has the disable level for a 2-2 section during which the driving signal is applied only to the plurality of second touch electrodes in the second section.

The touch driver may receive detection signals from the plurality of first touch electrodes and the plurality of second touch electrodes when the driving signal applied to the plurality of first touch electrodes has the disable level in the second section, and may receive detection signals from the plurality of first touch electrodes and the plurality of second touch electrodes when the driving signal applied to the plurality of touch signals has the disable level in the second section.

The touch driver may receive detection signals from the plurality of first touch electrodes and the plurality of second touch electrodes when the driving signal has the disable level for a 2-1 section during which the driving signal is applied only to the plurality of first touch electrodes in the second section, and may receive detection signals from the plurality of first touch electrodes and the plurality of second touch electrodes when the driving signal has the disable level for a 2-2 section in which the driving signal is applied only to the plurality of second touch electrodes in the second section.

The touch driver may alternately apply the driving signal having the enable level to the plurality of first touch electrodes and the plurality of second touch electrodes in the second section, and may receive detection signals from at least one type of touch electrodes among the plurality of first touch electrodes and the plurality of second touch electrodes for a period before the driving signal having the enable level is applied to the plurality of second touch electrodes after the driving signal of the enable level is applied to the plurality of first touch electrodes and for a period before the driving signal of the enable level is applied to the plurality of first touch electrodes after the driving signal of the enable level is applied to the plurality of second touch electrodes.

The touch driver may receive detection signals from at least one type of touch electrodes among the plurality of first touch electrodes and the plurality of second touch electrodes when driving signals having the same phase are applied to the plurality of first touch electrodes and the plurality of second touch electrodes and the driving signals have the disable level in the second section A ratio of a disable level section with respect to an enable level section within one repeating period of the driving signal applied to the at least one type of touch electrodes among the plurality of first touch electrodes and the plurality of second touch electrodes in the second section may include at least one of a:2b+1, a:2b+2, a:2b+3, a:2b+4, a:3b+1, a:2 b+3+1, a:2 b+3, and a:2b+1, where a and b are integers.

The touch driver may apply the first driving signal to at least one type of the plurality of first touch electrodes and the plurality of second touch electrodes in the first section.

The touch apparatus may further include a controller that acquires touch coordinate information by using a detection signal received during the second section by the touch driver.

The controller may determine a type of a touch object by using a detection signal received during the second section by the touch driver.

The touch driver may include a first driver that is connected to the plurality of first touch electrodes and a second driver that is connected to the plurality of second touch electrodes, and the first driver may include a differential amplifier connected to two first touch electrodes and an ADC that converts a differentially amplified signal to a digital signal.

The two first touch electrodes may be separated from each other while disposing at least one first touch electrode therebetween.

A touch apparatus according to another exemplary embodiment includes: a touch panel that includes a plurality of first touch electrodes extending in a first direction and arranged in a second direction that crosses the first direction, and a plurality of second touch electrodes extending in the second direction and arranged in the first direction; a touch driver that applies a first driving signal for generation of a resonance signal of a stylus pen to the plurality of first touch electrodes and the plurality of second touch electrodes in a first section, and applies a second driving signal to the plurality of first touch electrodes and the plurality of second touch electrodes within one repeating period in a second section, which is next to the first section, the second driving signal having a ratio of a disable level section with respect to an enable level section that is different from a ratio of the first driving signal, and receives detection signals from the plurality of first touch electrodes and the plurality of second touch electrodes when the second driving signal has a disable level during the second section; and a controller that acquires touch coordinate information by using the detection signal received during the second section, and determines a type of a touch object.

One period of the second driving signal may include a section during which an enable level section and a disable level section repeat at least a times, and a section during which the disable level section may be maintained at least 2a times.

A touch detection method according to an exemplary embodiment includes: in a first section, applying a first driving signal for generation of a resonance signal of a stylus pen to a touch panel that includes a plurality of first touch electrodes extending in a first direction and arranged in a second direction that crosses the first direction, and a plurality of second touch electrodes extending in the second direction and arranged in the first direction; receiving detection signals from the plurality of first touch electrodes and the plurality of second touch electrodes in a second section, which is next to the first section; and acquiring touch coordinate information from the detection signal.

The touch detection method may further include, in the second section next to the first section, applying a driving signal of which a ratio of a disable level section with respect to an enable level section is different in one repeating period, compared to the first driving signal, to at least one type of the plurality of first touch electrodes and the plurality of second touch electrodes.

A ratio of the disable level section with respect to the enable level section within one repeating period of the driving signal applied to the at least one type of touch electrodes among the plurality of first touch electrodes and the plurality of second touch electrodes in the second section may include at least one of a:2b+1, a:2b+2, a:2b+3, a:2b+4, a:3b+1, a:2 b+3+1, a:2 b+3, and a:2b+1, where a and b are integers.

Advantageous Effects

According to the exemplary embodiments, the touch apparatus and the touch detection method of the touch apparatus include a merit capable of obtaining touch coordinates in a short time long two axes that cross each other.

According to the exemplary embodiment, the touch apparatus and the touch detection method of the touch apparatus have a merit capable of securing a sufficient touch signal processing time.

DETAILED DESCRIPTION OF THE EMBODIMENTS

Figure 1:
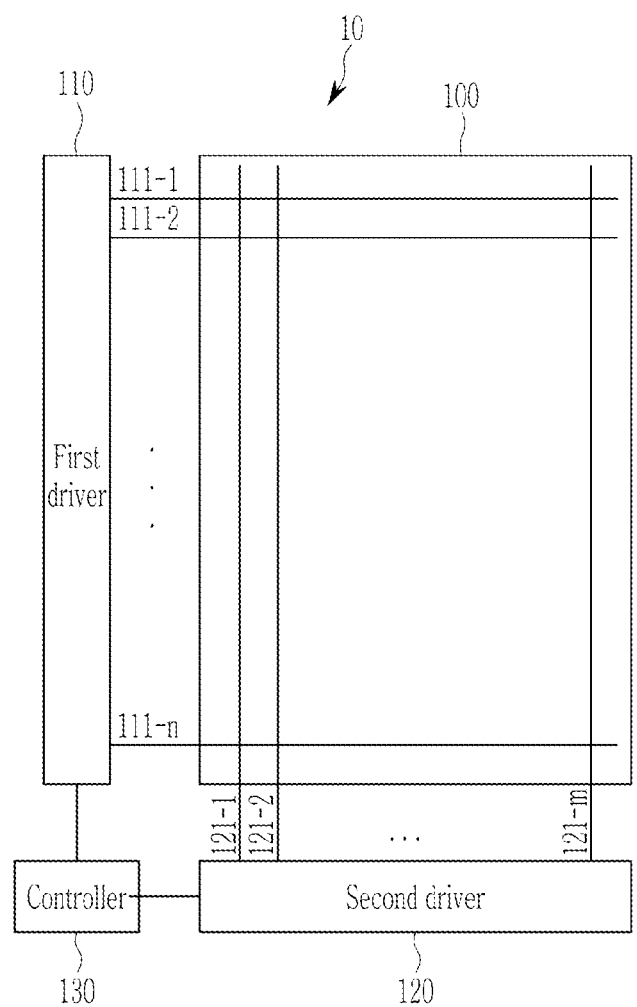
FIG. 1 schematically illustrates a touch apparatus according to an exemplary embodiment.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In describing the present invention, parts that are not related to the description will be omitted. Like reference numerals generally designate like elements throughout the specification.

In addition, the size and thickness of each component shown in the drawings are arbitrarily shown for better understanding and ease of description, but the present invention is not limited thereto. In the drawings, the thickness of layers, films, panels, regions, etc., are exaggerated for clarity. In the drawings, for convenience of explanation, the thickness of some layers and regions is exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, when an element is referred to as being "above" or "on" a part serving as a reference, the element may be positioned on or under the reference part, and it does not mean that the element is essentially positioned "above" or "on" in a direction opposite to gravity.

In addition, unless explicitly described to the contrary, the word "comprise", and variations such as "comprises" or "comprising", will be understood to imply the inclusion of stated elements but not the exclusion of any other elements.

Hereinafter, a touch apparatus and a touch detection method of the touch apparatus according to exemplary embodiments will be described with reference to the accompanying drawings.

Figure 2:
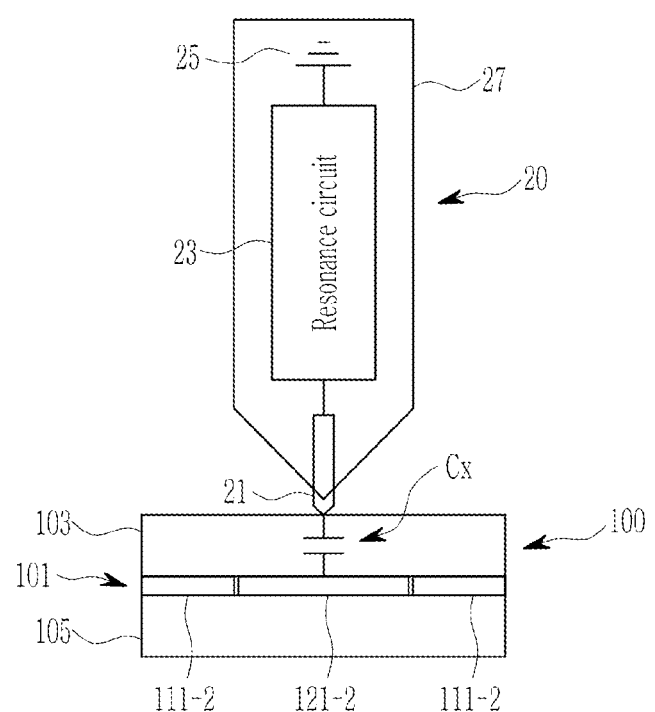
FIG. 2 shows an example in which the touch apparatus is touched by a stylus pen.

FIG. 1 schematically illustrates a touch apparatus according to an exemplary embodiment, and FIG. 2 shows an example in which the touch apparatus is touched by a stylus pen.

Referring to FIG. 1, a touch apparatus 10 according to an exemplary embodiment may include a touch panel 100, first and second drivers 110 and 120 that drive the touch panel 100, and a touch controller 130.

The touch panel 100 includes a plurality of first touch electrodes 111-1 to 111-$n$ extending in a first direction, and a plurality of second touch electrodes 121-1 to 121-$m$ extending in a second direction which crosses the first direction. In the touch panel 100, the plurality of first touch electrodes 111-1 to 111-$n$ may be arranged along the second direction, and the plurality of second touch electrodes 121-1 to 121-$m$ may be arranged along the first direction. In FIG. 1, the shape of the touch panel 100 is illustrated to be a quadrangle, but this is not restrictive.

As shown in FIG. 2, the touch panel 100 includes a substrate 105 and a window 103. The plurality of first touch electrodes 111-1 to 111-$n$ and the plurality of second touch electrodes 121-1 to 121-$m$ may be disposed on the substrate 105. In addition, the window 103 may be disposed on the plurality of first touch electrodes 111-1 to 111-$n$ and the plurality of second touch electrodes 121-1 to 121-$m$. In FIG. 2, the plurality of first touch electrodes 111-1 to 111-$n$ and the plurality of second touch electrodes 121-1 to 121-$m$ are disposed on the same layer, but they may be respectively disposed on different layers, and this is not restrictive.

The plurality of first touch electrodes 111-1 to 111-$n$ are connected to the first driver 110, and the plurality of second touch electrodes 121-1 to 121-$m$ are connected to the second driver 120. In FIG. 1, the first driver 110 and the second driver 120 are separated, but they may be implemented as a single module, unit, or chip, but this is not restrictive.

The first driver 110 may apply a driving signal to the plurality of first touch electrodes 111-1 to 111-$n$. In addition, the first driver 110 may receive a detection signal from the plurality of first touch electrodes 111-1 to 111-$n$. Like the first driver 110, the second driver 120 may apply a driving signal to the plurality of second touch electrodes 121-1 to 121-$m$. In addition, the second driver 120 may receive a detection signal from the plurality of first touch electrodes 121-1 to 121-$m$.

A driving signal may include a signal (e.g., a sine wave, a square wave, etc.) having a frequency corresponding to a resonance frequency of a stylus pen 20. The resonance frequency of the stylus pen 20 depends on the design value of a resonance circuit 23 of the stylus pen 20.

The touch apparatus 10 may be used to detect a touch input (direct touch or a proximity touch) by a touch object. As shown in FIG. 2, a touch input of the stylus pen 20 adjacent to the touch panel 100 may be detected by the touch device 10.

The stylus pen 20 may include a conductive tip 21, the resonance circuit 23, a ground 25, and a body 27.

At least a part of the conductive tip 21 is formed of a conductive material (e.g., a metal, conductive rubber, conductive fabric, conductive silicon, and the like), and the conductive tip 21 may be electrically connected to the resonance circuit 23.

The resonance circuit 23 is an LC resonance circuit, and may resonant with driving signals applied to at least one type of electrodes among the plurality of first touch electrodes 111-1 to 111-$n$ and the plurality of second touch electrodes 121-1 to 121-$m$ from at least one of the first driver 110 and the second driver 120 through the conductive tip 21.

A resonance signal generated by the resonance circuit 23 resonating with the driving signal may be output to the touch panel 100 through the conductive tip 21. The resonance signal generated by resonance of the resonance circuit 23 may be transmitted to the conductive tip 21 in a section after a section during which the driving signals are applied to at least one type of electrodes among the plurality of first touch electrodes 111-1 to 111-$n$ and the plurality of second touch electrodes 121-1 to 121-$m$. The resonance circuit 23 is disposed inside the body 27, and may be electrically connected to the ground 25.

Such a type of stylus pen 20 may generate a touch input by generating a resonance signal in response to a driving signal applied to at least one of the touch electrodes 111-1 to 111-$n$ and 121-1 to 121-$m$.

Capacitance Cx is formed by at least one of the touch electrodes 111-1 to 111-$n$ and 121-1 to 121-$m$ and the conductive tip 21 of the stylus pen 20. Through the capacitance Cx between at least one of the touch electrodes 111-1 to 111-$n$ and 121-1 to 121-$m$ and the conductive tip 21, the driving signal is transmitted to the stylus pen 20 and the resonance signal may be transmitted to the touch panel 100.

The touch apparatus 10 can detect a touch by a touch object (e.g., a user's body (a finger and the like), or a passive or active stylus pen) other than the stylus pen 20 that uses a method for generating the resonance signal described above, but is not limited thereto.

For example, the touch apparatus 10 may detect a touch by a stylus pen that receives an electrical signal and output the received signal as a magnetic field signal. For example, the touch apparatus 10 may further include a digitizer. The magnetic field signal that is electromagnetically resonated (or electromagnetically induced) by the stylus pen is detected by the digitizer, and thus the touch can be detected. Alternatively, the touch apparatus 10 may detect a touch by a stylus pen that receives a magnetic field signal and output the received signal as a resonated magnetic field signal. For example, the touch apparatus 10 may further include a coil and a digitizer that apply current as a driving signal. The stylus pen resonates with the magnetic field signal generated by the coil applied with the current. In the stylus pen, a touch can be detected by detecting an electromagnetically resonated (or electromagnetically induced) magnetic field signal by a digitizer.

The controller 130 controls driving of the touch apparatus 10, and may output touch coordinate information corresponding to a touch detection result of the touch apparatus 10.

Next, referring to FIG. 3, the first and second drivers 110 and 120 of the touch apparatus 10 will be described in detail.

Figure 3:
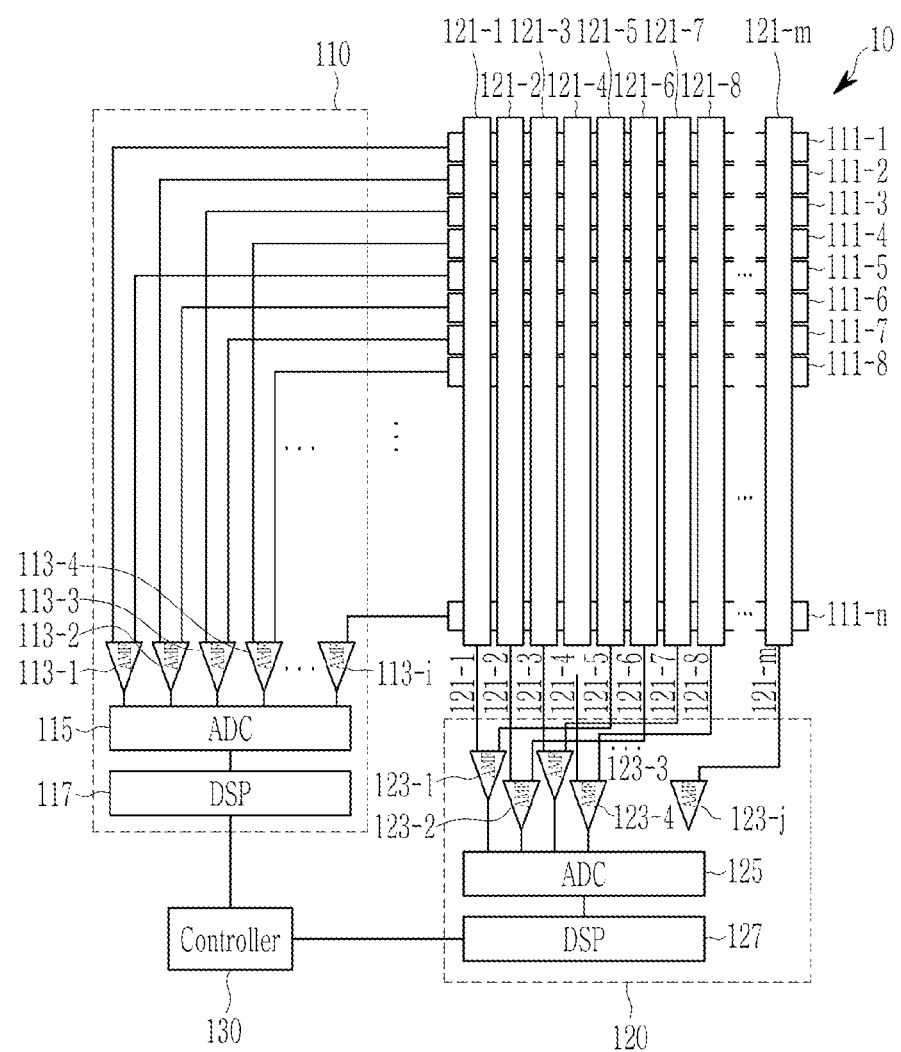
FIG. 3 shows the touch apparatus of FIG. 1 in detail.

FIG. 3 shows the touch apparatus of FIG. 1 in detail.

As shown in the drawing, the first driver 110 includes a plurality of differential amplifiers 113-1 to 113-$i$, an ADC 115, and a digital signal processor (DSP) 117. The second driver 120 includes a plurality of differential amplifiers 123-1 to 123-$j$, an ADC 125, and a DSP 127.

An input terminal of each of the differential amplifiers 113-1 to 113-$i$ and 123-1 to 123-$j$ is connected to two touch electrodes that are separated from each other by at least one touch electrode. Each of the differential amplifiers 113-1 to 113-$i$ and 123-1 to 123-$j$ may differentially amplify two detection signals transmitted from the touch electrodes and then outputs the differentially amplified signals. Since each of the differential amplifiers 113-1 to 113-$i$ and 123-1 to 123-$j$ receives the detection signals from the two touch electrodes and then performs differential amplification, no saturation occurs even if driving signals are simultaneously applied to a plurality of touch electrodes.

Each of the differential amplifiers 113-1 to 113-$i$ and 123-1 to 123-$j$ may receive the detection signals from two separated touch electrodes rather than receiving from two adjacent touch electrodes. For example, each of the differential amplifiers 113-1 to 113-$i$ and 123-1 to 123-$j$ receives the detection signals from the two touch electrodes which are separated from each other while disposing one or more touch electrodes therebetween. In FIG. 3, the differential amplifier 113-1 receives detection signals from the touch electrode 111-1 and the touch electrode 111-5. When the differential amplifier 113-1 receives detection signals from two adjacent touch electrodes (e.g., the touch electrode 111-1 and the touch electrode 111-2), detection signals due to the touch in a region between the touch electrode 111-1 and the touch electrode 111-2 are not strong enough even though they are differentially amplified by the differential amplifier 113-1. Therefore, when the differential amplifier 113-1 is connected to two adjacent touch electrodes, touch sensitivity is deteriorated. However, since the differential amplifier 113-1 receives detection signals from the touch electrode 111-1 and the touch electrode 111-5, the detection signal due to the touch electrode at the touch input position can be differentially amplified to have a sufficiently strong value, and the touch sensitivity can be improved.

Each of the ADCs 115 and 125 converts a differentially amplified detection signal to a digital signal. In addition, each of the DSPs 117 and 127 processes the plurality of differentially amplified signals, which have been converted to digital signals, and then transmits the processed signals to the controller 130.

Next, referring to FIG. 4, a touch detection method according to the exemplary embodiment will be described.

Figure 4:
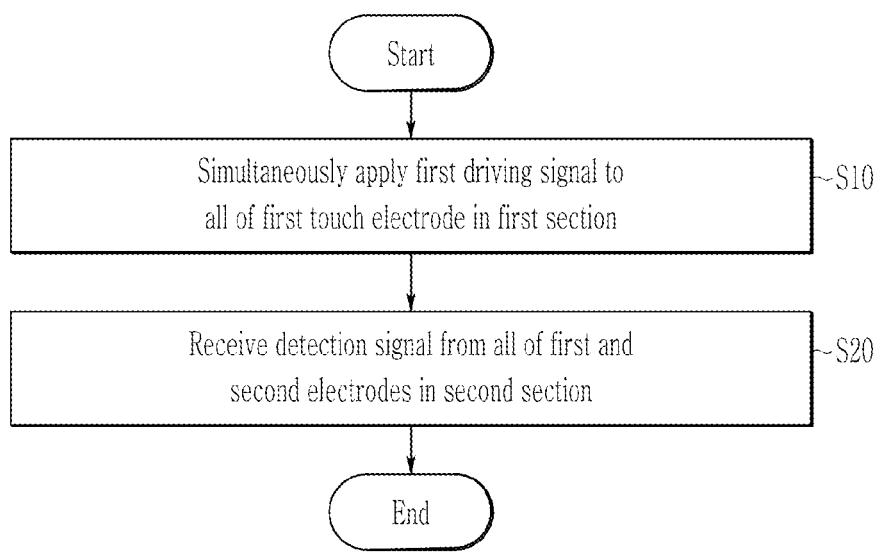
FIG. 4 is a flowchart of a touch detection method according to the exemplary embodiment.

FIG. 4 is a flowchart of a touch detection method according to the exemplary embodiment.

In a first section, the first driver 110 simultaneously applies driving signals to the plurality of first touch electrodes 111-1 to 111-$n$ (S10). The resonance circuit 23 of the stylus pen 20 resonates with the driving signal such that a resonance signal is generated and then transmitted to the touch panel 100 through the conductive tip 21.

In the above description, in the first section, the first driver 110 simultaneously applies the driving signals to the plurality of first touch electrodes 111-1 to 111-$n$, but, in the first section, the second driver 120 may apply the driving signals to the plurality of second touch electrodes 121-1 to 121-$m$, or the first driver 110 and the second driver 120 may simultaneously apply the driving signals to the plurality of first touch electrodes 111-1 to 111-$n$ and simultaneously apply the driving signals to the plurality of second touch electrodes 121-1 to 121-$m$. When the first driver 110 and the second driver 120 apply the driving signals to the plurality of first touch electrodes 111-1 to 111-$n$ and the plurality of second touch electrodes 121-1 to 121-$m$, it is assumed that the driving signal applied to the plurality of first touch electrodes 111-1 to 111-$n$ and the driving signal applied to the plurality of second touch electrodes 121-1 to 121-$m$ have the same phase, but are not limited thereto. In step S10, the first driver 110 simultaneously may apply the driving signals to all of the first touch electrodes 111-1 to 111-$n$, and/or the second driver 120 simultaneously may apply the driving signals to all of the second touch electrodes 121-1 to 121-$m$.

In a second section after the first section, the first driver 110 receives detection signals transmitted from the plurality of first touch electrodes 111-1 to 111-$n$, and the second driver 120 receives detection signals from the plurality of second touch electrodes 121-1 to 121-$m$ (S20). The first driver 110 and the second driver 120 may process the received detection signals and then transmit the processed signals to the controller 130. The controller 130 may acquire touch coordinate information at a position where a touch of the stylus pen 20 is generated by using the transmitted detection signal.

Such a touch detection method will be described with reference to FIG. 5 and FIG. 6.

Figure 5:
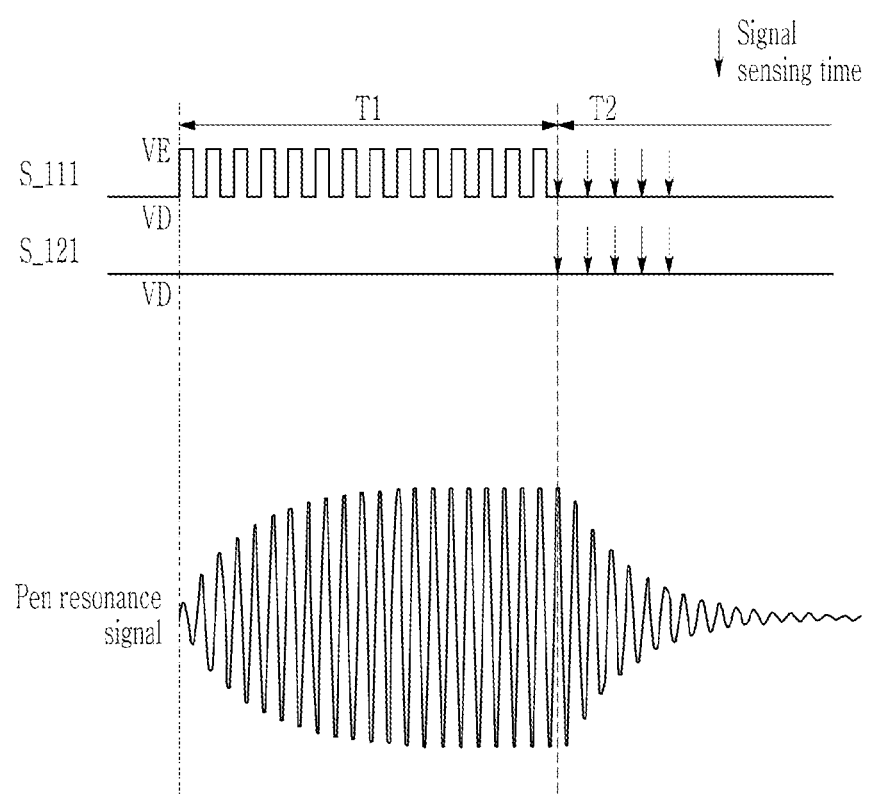
FIG. 5 and FIG. 6 are waveform diagrams of the driving signals and pen resonance signals according to the touch detection method of FIG. 4.
Figure 6:
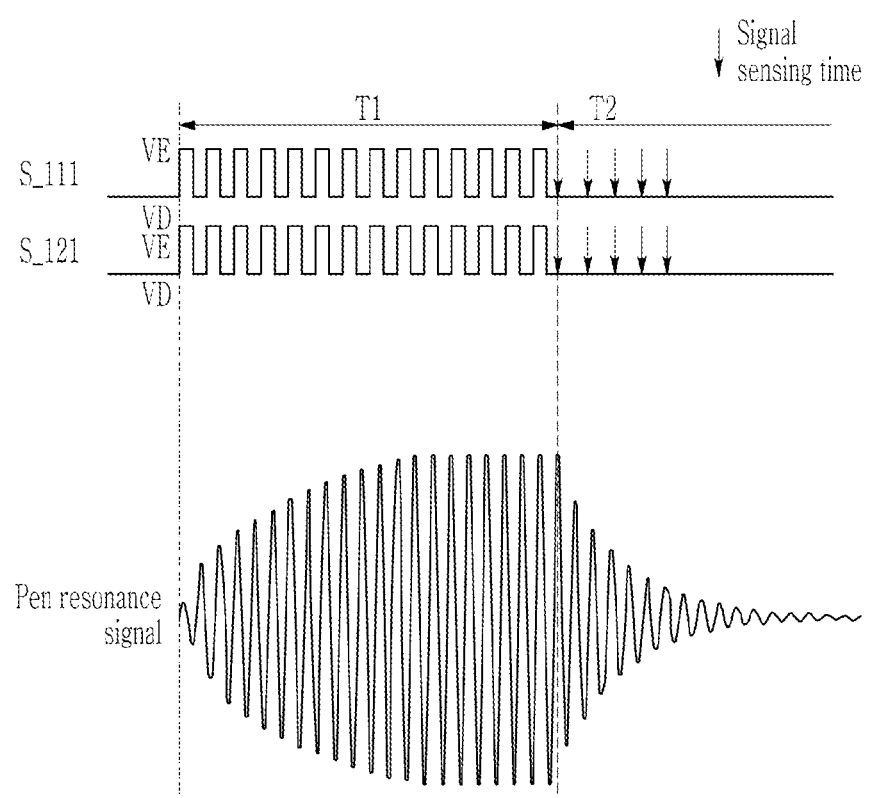

FIG. 5 and FIG. 6 are waveform diagrams of the driving signals and pen resonance signals according to the touch detection method of FIG. 4.

As shown in FIG. 5, in the first section T1, a driving signal S_111 is applied to the plurality of first touch electrodes 111-1 to 111-$n$. The driving signal S_111 has an enable-level voltage VE and a disable-level voltage VD, and is a pulse signal having a similar frequency to a resonance frequency of the stylus pen 20. The stylus pen 20 outputs a signal that resonates with the driving signal S_111. In the first section T1, intensity of the pen resonance signal increases as the driving signal S_111 is applied. After a certain period of time, the intensity of the pen resonance signal is saturated.

In the first section T1, not all of the plurality of second touch electrodes 121-1 to 121-*m* are applied with the driving signal. In addition, receiving of the detection signals in the first section T1 from the plurality of first touch electrodes 111-1 to 111-*n* and the plurality of second touch electrodes 121-1 to 121-*m* is not carried out.

When the first section T1 is terminated, the first driver 110 stops application of the driving signal S_111. During the second section T2, driving signals S_111 and S_121 are not applied to the plurality of first touch electrodes 111-1 to 111-*n* and the plurality of second touch electrodes 121-1 to 121-*m*.

In the second section T2, the first driver 110 and the second driver 120 may receive the detection signals from all of the plurality of first touch electrodes 111-1 to 111-*n* and the plurality of second touch electrodes 121-1 to 121-*m*. The first driver 110 and the second driver 120 may receive a pen resonance signal in the second section T2 during which the driving signals S_111 and S_121 are not applied, as a detection signal. The controller 130 may determine a touch position in the touch panel 100 and a type of the touch object through the detection signal received in the second period T2. The touch apparatus 10 according to the exemplary embodiment receives the detection signals through all of the plurality of first touch electrodes 111-1 to 111-*n* and the plurality of second touch electrodes 121-1 to 121-*m* in the second section T2, and thus there is a merit of quickly acquiring touch coordinates along two intersecting axes.

As shown in FIG. 6, in the first section T1, the driving signal S_111 is applied to the entire plurality of first touch electrodes 111-1 to 111-*n* and the driving signal S_121 is applied to the entire plurality of second touch electrodes 121-1 to 121-*m*. The driving signals S_111 and S_121 have an enable-level voltage VE and a disable-level voltage VD, and are pulse signals having a similar frequency to a resonance frequency of the stylus pen 20. In FIG. 6, it is illustrated that the enable-level voltage VE and the disable-level voltage VD of the driving signals S_111 and S_121 are the same and in-phase signals, but the present invention is not limited thereto. In the first section T1, intensity of the pen resonance signal increases as the driving signals S_111 and S_121 are applied. After a certain period of time, the intensity of the pen resonance signal is saturated. The intensity of the pen resonance signal saturated in the first section T1 according to the exemplary embodiment of FIG. 6 may be higher than the intensity of the pen resonance signal saturated in the first section T1 according to the exemplary embodiment of FIG. 5. In the first section T1, detection signals of the plurality of first touch electrodes 111-1 to 111-*n* and the plurality of second touch electrodes 121-1 to 121-*m* are not received.

When the first section T1 is terminated, the driver 110 stops applying the driving signal S_111 and the second driver 120 also stops applying the driving signal S_121. During the second section T2, the driving signals S_111 and S_121 are not applied to the plurality of first touch electrodes 111-1 to 111-*n* and the plurality of second touch electrodes 121-1 to 121-*m*.

During the second section T2, the first driver 110 and the second driver 120 may receive detection signals from the plurality of first touch electrodes 111-1 to 111-*n* and the plurality of second touch electrodes 121-1 to 121-*m*. The first driver 110 and the second driver 120 may receive a pen resonance signal in the second section T2 during which the driving signals S_111 and S121 are not applied, as a detection signal. The controller 130 may determine a touch position in the touch panel 100 and a type of the touch object through the detection signal received in the second period T2. The touch apparatus 10 according to the exemplary embodiment receives the detection signals through all of the plurality of first touch electrodes 111-1 to 111-*n* and the plurality of second touch electrodes 121-1 to 121-*m* in the second section T2, and thus there is a merit of quickly acquiring touch coordinates along two intersecting axes.

In addition, in the first section T1, the plurality of first touch electrodes 111-1 to 111-*n* and the plurality of second touch electrodes 121-1 to 121-*m* are all simultaneously applied with the same driving signals S_111 and S121, and thus intensity of the resonance signal of the stylus pen 20, which responds the driving signals, can be significantly increased.

In the above description, receiving of the detection signal may be performed at least once in the second section T2 by at least one of the first driver 110 and the second driver 120. In addition, a time at which the detection signal is received may be at least one of times (signal sensing times) respectively illustrated in FIG. 5 and FIG. 6, and may also include an arbitrary time in the second section T2, which is not illustrated in FIG. 5 and FIG. 6, but this is not restrictive.

Next, referring to FIG. 7, types of driving signals S_111 and S1_212, which can be applied to the plurality of first touch electrodes 111-1 to 111-*n* and the plurality of second touch electrodes 121-1 to 121-*m*, will be described with reference to FIG. 7.

Figure 7:
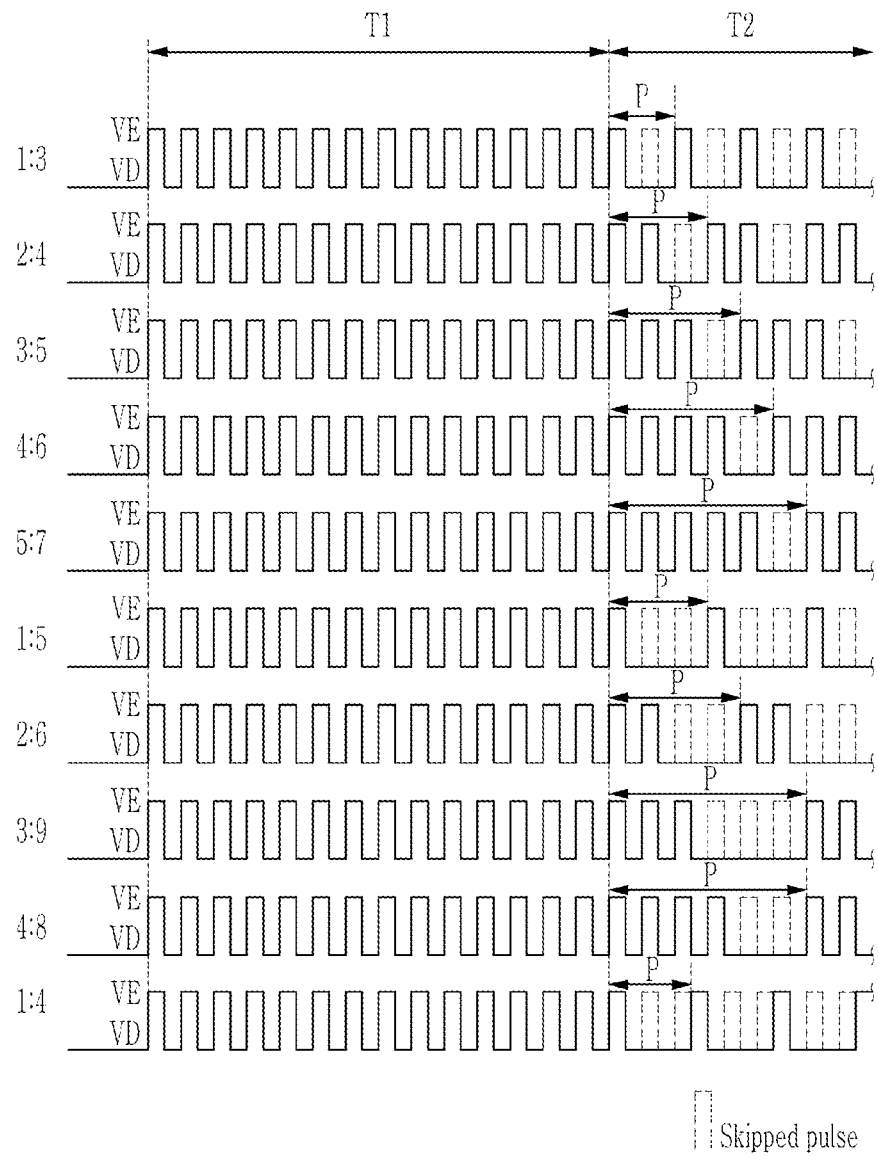
FIG. 7 is a waveform diagram of driving signals according to various aspects according to the exemplary embodiment.

FIG. 7 is a waveform diagram of driving signals according to various aspects according to the exemplary embodiment.

During the first section T1, at least one type of the plurality of first touch electrodes 111-1 to 111-*n* and the plurality of second touch electrodes 121-1 to 121-*m* are applied with a first driving signal of which an enable-level pulse repeats with a predetermined cycle. During the first section T1, the resonance signal of the stylus pen 20 can quickly reach a predetermined voltage level (i.e., can be saturated) by the first driving signal.

During the second section T2, at least one type of the plurality of first touch electrodes 111-1 to 111-*n* and the plurality of second touch electrodes 121-1 to 121-*m* are applied with a driving signal having a plurality of sections that are different from a disable-level section.

For example, when a duty ratio (e.g., a ratio of the disable-level section with respect to the enable-level section within one iterative period P) of the first driving signal output in the first section T1 is 1:1, a driving signal output in the second section T2 may have a duty ratio of a:2b+1, a:2b+2, a:2b+3, a:2b+4, a:3b+1, a:2 b+3+1, a:2 b+3, a:2b+1 . . . , and the like. Here, a and b are integers. A period that corresponds to at least one period P of a driving signal output in the second section T2 may include a period during which the enable-level section and the disable-level section repeat at least n times and a period during which the disable-level section is maintained at least 2n times. The enable-level section corresponds to a section during which the driving signal has the enable level VE, and the disable-level section corresponds to a section during which the driving signal has the disable level VD. The duty ratio of the driving signal is only an example, and may include all ratios that allow the resonance signal of the stylus pen 20 that has reached a predetermined level to be maintained at an effective level.

The resonance signal of the stylus pen 20, which has reached a predetermined level by the first driving signal in the first section T1, may be maintained at an effective level by the driving signal in the second section T2. Here, the effective level means a level at which the controller 130 can detect the resonance signal of the stylus pen 20 as a touch signal.

The driving signal in the second section T2 may be a signal of which at least one pulse is periodically omitted in the first driving signal of the first section T1. As described above, the driving signal in the second section T2 is output with a form of which at least one pulse is periodically omitted compared to the first driving signal in the first section T1, and thus the first driving signal in the first section T1 and the driving signal in the second section T2 may have different pulse speeds. That is, the driving signal in the second section T2 may have a slower pulse speed than that the pulse speed of the first driving signal in the first section T1. Here, the pulse speed may be the number of pulses output per unit time (e.g., 1 second).

Energy transmitted from the touch apparatus 10 to the stylus pen 20 may increase as the number of skipped pulses of the driving signal in the second section T2 decreases. Thus, as the number of skipped pulses of the driving signal is decreased in the second section T2, a signal level of a pen resonance signal generated in the second section T2 is increased. In addition, as the number of skipped pulses of the driving signal is increased, energy consumed for output of the driving signal may decrease. Accordingly, as the number of skipped pulses of the driving signal in the second period T2 increases, the energy consumed by the touch apparatus 10 in the second period T2 may decrease.

Figure 8:
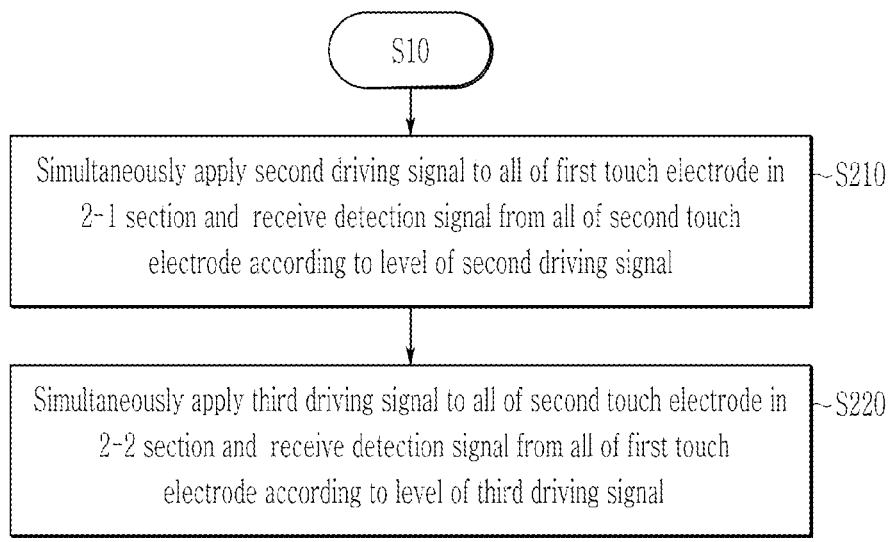
FIG. 8 is a flowchart of a touch detection method according to a first aspect.

Next, a touch detection method of a case that the driving signal in the second section T2 described with reference to FIG. 7 is applied will be described with reference to FIG. 8 to FIG. 18. In FIG. 8 and FIG. 18, the driving signal applied to the touch electrodes 111-1 to 111-n and 121-1 to 121-m during the second period T2 is described assuming that the ratio of the non-skipped pulse to the skipped pulse is 1:1.

Figure 9:
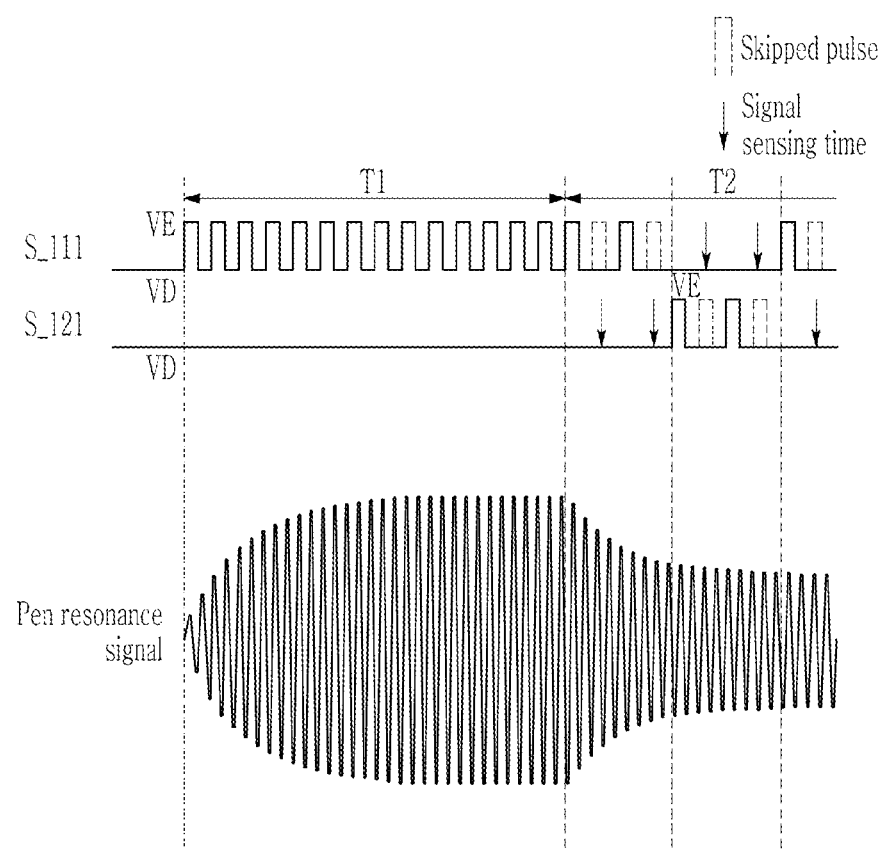
FIG. 9 is a waveform diagram of a driving signal and a pen resonance signal according to the touch detection method of FIG. 8.
Figure 11:
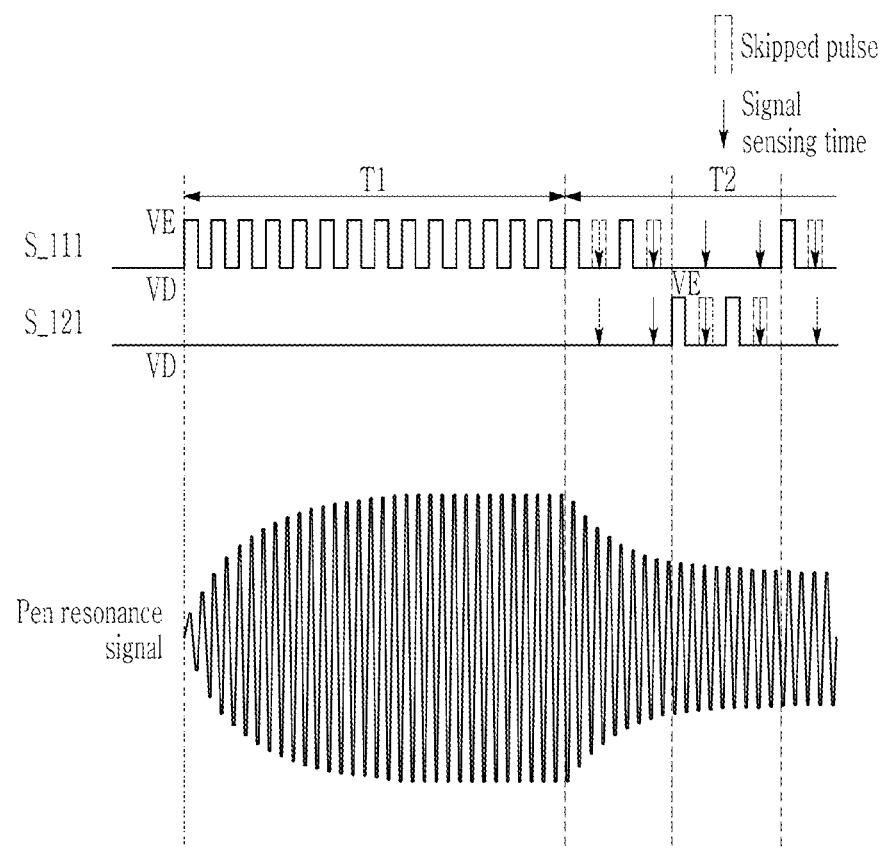
FIG. 11 is a waveform diagram of a driving signal and a pen resonance signal according to the touch detection method of FIG. 10.

For example, as shown in FIG. 9, FIG. 11, FIG. 13, and FIG. 15, a combination of a driving signal applied to the plurality of first touch electrodes 111-1 to 111-n and a driving signal applied to the plurality of second touch electrodes 121-1 to 121-m may be shown as the driving signal of which the duty ratio is 1:3 as shown in FIG. 7. Specifically, in the exemplary embodiment of FIG. 9 and FIG. 11, a driving signal may be applied to a plurality of first touch electrodes 111-1 to 111-n during a 2-1 section with a pulse sequence of an enable level VE pulse, a skipped pulse, an enable-level VE pulse, and a skipped pulse, and then a driving signal may be applied to a plurality of second touch electrodes 121-1 to 121-m with a pulse sequence of the enable-level VE pulse, the skipped pulse, the enable-level VE pulse, and the skipped pulse. In FIG. 9 and FIG. 11, the enable-level VE pulse and the skipped pulse are applied to one type of touch electrodes two times, but as in the exemplary embodiment of FIG. 13 and FIG. 15, the enable-level VE pulse and the skipped pulse may be applied to one type of touch electrodes one time, but the present invention is not limited to the number of applications.

Figure 17:
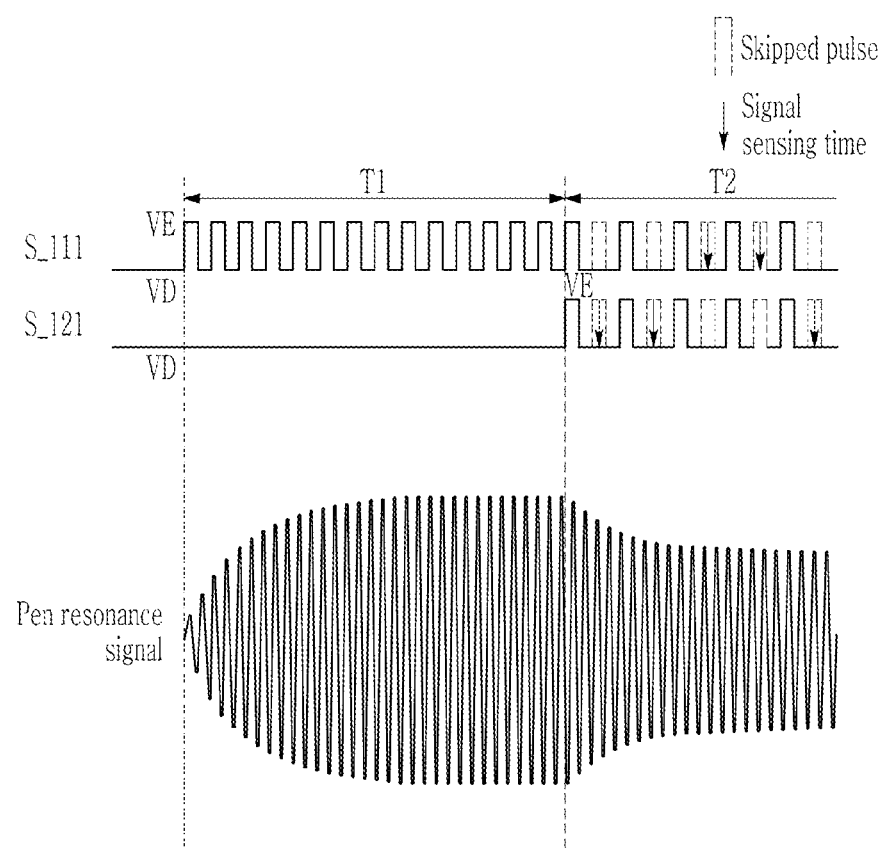
FIG. 17 and FIG. 18 are waveform diagrams of a driving signal and a pen resonance signal according to the touch detection method of FIG. 16.
Figure 18:
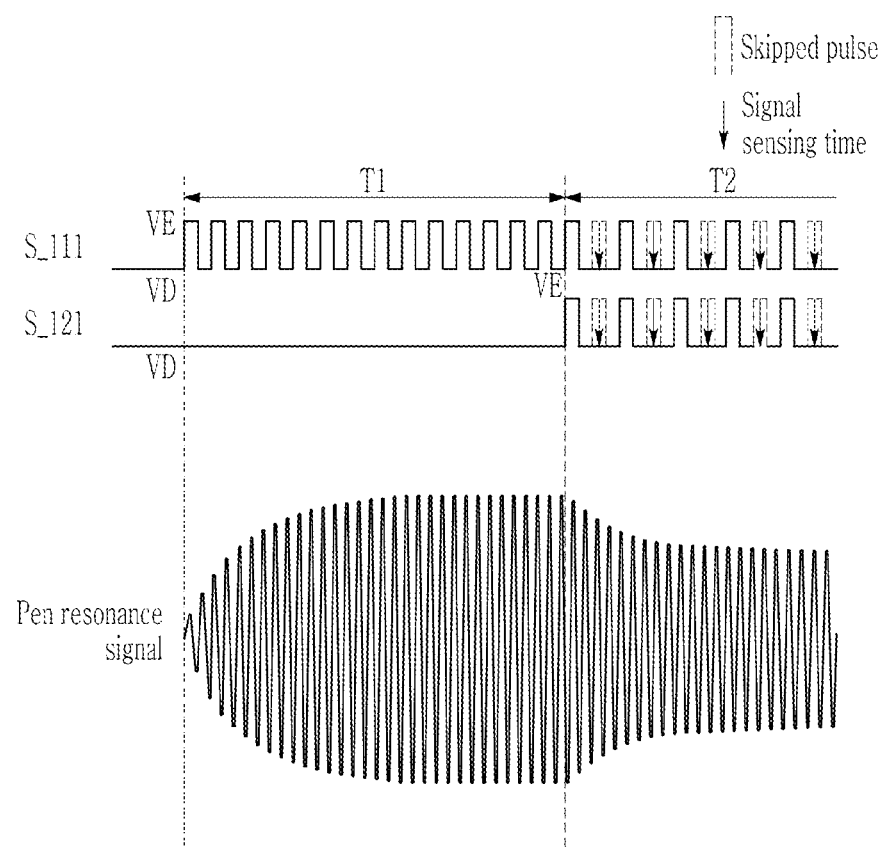

Alternatively, as shown in FIG. 17 and FIG. 18, the driving signal applied to a plurality of first touch electrodes 111-1 to 111-n and a driving signal applied to a plurality of second touch electrodes 121-1 to 121-m may respectively be driving signals of FIG. 7, of which duty ratio is 1:3.

FIG. 8 is a flowchart of a touch detection method according to a first aspect, and FIG. 9 is a waveform diagram of a driving signal and a pen resonance signal according to the touch detection method of FIG. 8.

Referring to FIG. 8, a first driver 110 simultaneously applies a second driving signal to a plurality of first touch electrodes 111-1 to 111-n during a 2-1 section in a second section T2, and a second driver 120 receives detection signals from the plurality of second touch electrodes 121-1 to 121-m according to a level of the driving signal (S210). A resonance signal of a stylus pen 20 may be maintained with an effective level by a driving signal S_111 in the 2-1 section in the second section T2.

As shown in FIG. 9, during the 2-1 section, a second driving signal S_111 may be applied only to the plurality of first touch electrodes 111-1 to 111-n. During the 2-1 section, detection signals may be received from the plurality of second touch electrodes 121-1 to 121-m for a section during which a pulse of the driving signal S_111 is skipped. That is, the second driver 120 may receive the detection signal from all of the plurality of second touch electrodes 121-1 to 121-m while the driving signals applied to the plurality of first touch electrodes 111-1 to 111-n and the plurality of second touch electrodes 121-1 to 121-m have a disable level.

Referring to FIG. 8, during a 2-2 section in the second section T2, the second driver 120 simultaneously applies a third driving signal S-121 to all of the plurality of second touch electrodes 121-1 to 121-m, and the first driver 110 receives detection signals from all of the plurality of first touch electrodes 111-1 to 111-n (S220). A resonance signal of the stylus pen 20 can be maintained with an effective level by the third driving signal S_121 in the 202 section in the second section T2.

As shown in FIG. 9, during the 2-2 section, the third driving signal S_121 may be applied only to the plurality of second touch electrodes 121-1 to 121-m. During the 2-2 section, the detection signals from all of the plurality of first touch electrodes 111-1 to 111-n can be received for a period during which a pulse of the third driving signal S_121 is skipped.

The 2-1 section and the 2-2 section may be alternately arranged within the second section T2. For example, when the 2-2 section terminates, the 2-2 section starts, and when the 2-2 section terminates, the 2-1 section starts.

The touch apparatus 10 and the touch detection method according to the first aspect have a merit of quickly acquiring touch coordinates along two axes that cross each other because the detection signals can be received through all of the plurality of first touch electrodes 111-1 to 111-n and the plurality of second touch electrodes 121-1 to 121-m in the second section T2.

Figure 10:
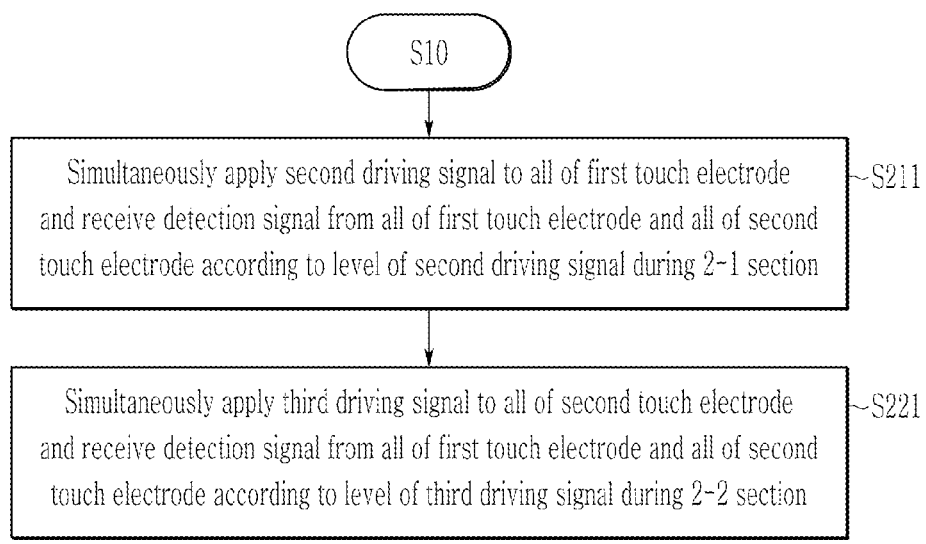
FIG. 10 is a flowchart of a touch detection method according to a second aspect.

FIG. 10 is a flowchart of a touch detection method according to a second aspect, and FIG. 11 is a waveform diagram of a driving signal and a pen resonance signal according to the touch detection method of FIG. 10.

Referring to FIG. 10, during the 2-1 section in the second section T2, the first driver 110 simultaneously applies the second driving signal S_111 to all of the plurality of first touch electrodes 111-1 to 111-n, and the first driver 110 and the second driver 120 receive detection signals from all of the plurality of first touch electrodes 111-1 to 111-n and the plurality of second touch electrodes 121-1 to 121-m according to a level of the second driving signal S_111 (S211). A resonance signal of the stylus pen 20 can be maintained with an effective level by the second driving signal S_111 in the 2-1 section in the second section T2.

As shown in FIG. 11, during the 2-1 section, the second driving signal S_111 may be applied only to the plurality of first touch electrodes 111-1 to 111-n. During the 2-1 section, the detection signals from all of the plurality of first touch electrodes 111-1 to 111-n and the plurality of second touch electrodes 121-1 to 121-m may be simultaneously received for a period during which a pulse of the second driving signal S_111 is skipped. That is, while the driving signals S_111 and S121 applied to the plurality of first touch electrodes 111-1 to 111-n and the plurality of second touch electrodes 121-1 to 121-m have the disable level, the first and second drivers 110 and 120 may simultaneously receive the detection signals from all of the plurality of first touch electrodes 111-1 to 111-n and the plurality of second touch electrodes 121-1 to 121-m.

Referring to FIG. 10, during the 2-2 section in the second section T2, the second driver 120 simultaneously applies the third driving signal _121 to all o the plurality of second touch electrodes 121-1 to 121-m, and the first driver 110 and the second driver 120 simultaneously receive the detection signals from all of the plurality of first touch electrodes 111-1 to 111-n and the plurality of second touch electrodes 121-1 to 121-m according to a level of the third driving signal S_121 (S221). A resonance signal of the stylus pen 20 can be maintained with an effective level by the third driving signal S_121 in the 2-2 section in the second section T2.

As shown in FIG. 11, during the 2-2 section, the third driving signal S_121 may be applied only to all of the plurality of second touch electrodes 121-1 to 121-m. During the 2-2 section, the detection signals from all of the plurality of first touch electrodes 111-1 to 111-n and the plurality o second touch electrodes 121-1 to 121-m can be simultaneously received for a period during which a pulse of the third driving signal S_121 is skipped.

The 2-1 section and the 2-2 section may be alternately arranged within the second section T2. For example, when the 2-2 section terminates, the 2-2 section starts, and when the 2-2 section terminates, the 2-1 section starts.

The touch apparatus 10 and the touch detection method according to the second aspect have a merit of quickly acquiring touch coordinates along two axes that cross each other because the detection signals can be received through all of the plurality of first touch electrodes 111-1 to 111-n and the plurality of second touch electrodes 121-1 to 121-m in the second section T2.

Figure 12:
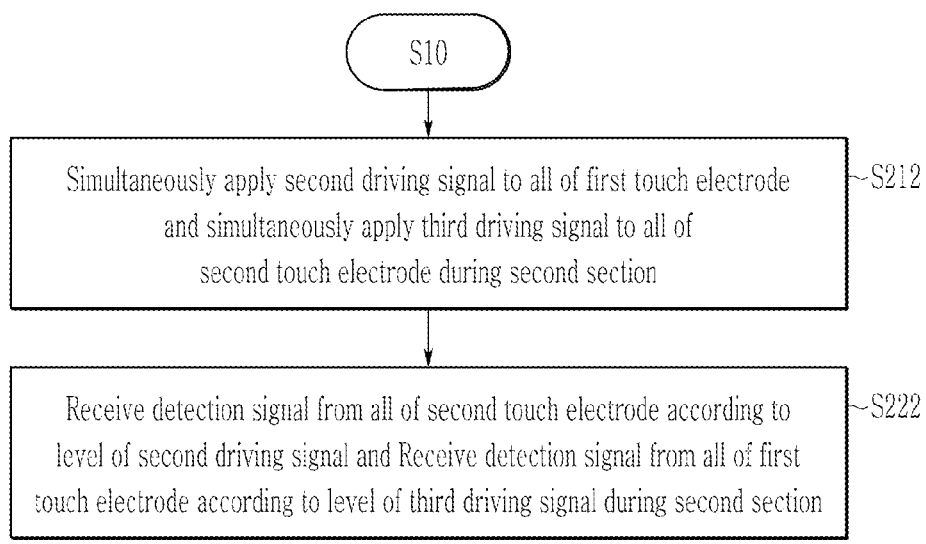
FIG. 12 is a flowchart of a touch detection method according to a second aspect.
Figure 13:
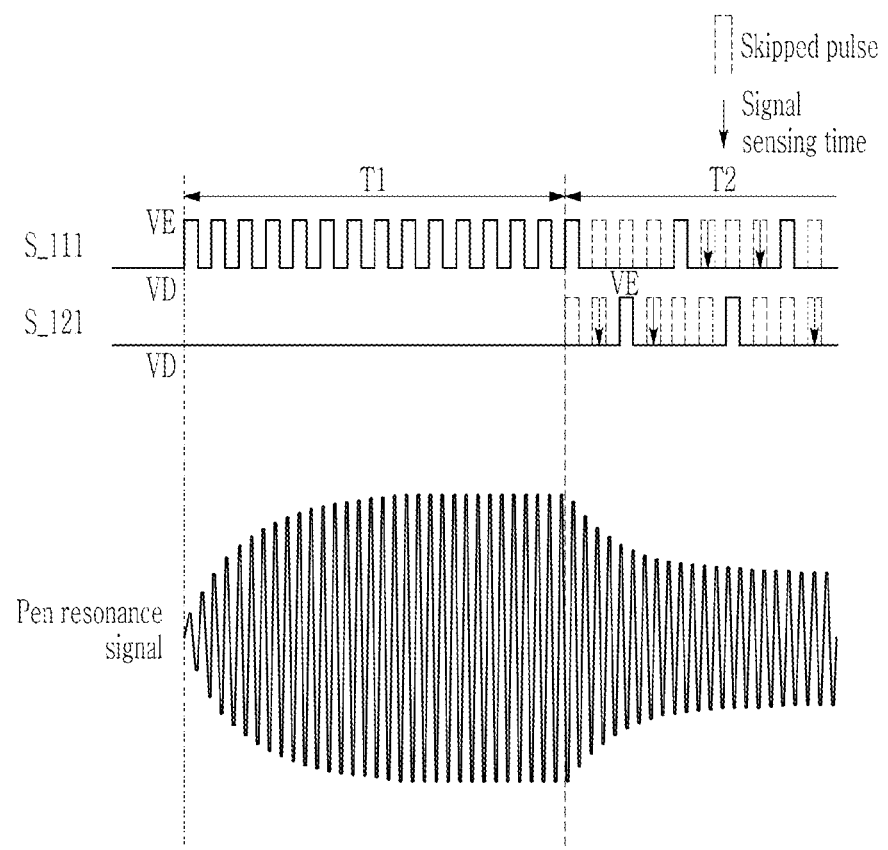
FIG. 13 is a waveform diagram of a driving signal and a pen resonance signal according to the touch detection method of FIG. 12.

FIG. 12 is a flowchart of a touch detection method according to a second aspect, and FIG. 13 is a waveform diagram of a driving signal and a pen resonance signal according to the touch detection method of FIG. 12.

Referring to FIG. 12, during the second section T2, the first driver 110 applies the second driving signal S_111 to all of the plurality of first touch electrodes 111-1 to 111-n, and the second driver 120 applies the third driving signal S_121 to all of the plurality of second touch electrodes 121-1 to 121-m (S212). A resonance signal of the stylus pen 20 can be maintained with an effective level by the second driving signal S_111 and the third driving signal S121 in the second section T2.

As shown in FIG. 13, during the second section T2, the second driving signal S_111 is applied to all of the plurality of first touch electrodes 111-1 to 111-n, and the third driving signal S_121 is applied to all of the plurality of second touch electrodes 121-1 to 121-m. Pulses of the enable level VE are alternately applied to all of the plurality of first touch electrodes 111-1 to 111-n and the plurality of second touch electrodes 121-1 to 121-m.

During the second section T2, the second driver 120 receives the detection signals from all of the plurality of second touch electrodes 121-1 to 121-m for a period during which the pulse of the second driving signal S_111 is skipped, and the first driver 110 receives the detection signals from all of the plurality of first touch electrodes 111-1 to 111-n for a period during which the pulse of the third driving signal S_121 is skipped (S222). That is, while the second driving signal applied to the plurality of first touch electrodes 111-1 to 111-n has the disable level and the third driving signal applied to the plurality of second touch electrodes 121-1 to 121-m has the disable level, the second driver 120 may receive the detection signals from all of the plurality of second touch electrodes 121-1 to 121-m.

The detection signals can be received from all of the plurality of first touch electrodes 111-1 to 111-n and the plurality of second touch electrodes 121-1 to 121-m during a period before the third driving signal S_121 having the enable level VE is applied to all of the plurality of second touch electrodes 121-1 to 121-m after the second driving signal S_111 having the enable level VE is applied to all of the plurality of first touch electrodes 111-1 to 111-n, and a period before the second driving signal S_111 having the enable level VE is applied to all of the plurality of first touch electrodes 111-1 to 111-n after the third driving signal S_121 having the enable level VE is applied to all of the plurality of second touch electrodes 121-1 to 121-m.

The touch apparatus 10 and the touch detection method according to the third aspect have a merit of quickly acquiring touch coordinates along two axes that cross each other because the detection signals can be received through all of the plurality of first touch electrodes 111-1 to 111-n and the plurality of second touch electrodes 121-1 to 121-m in the second section T2.

Figure 14:
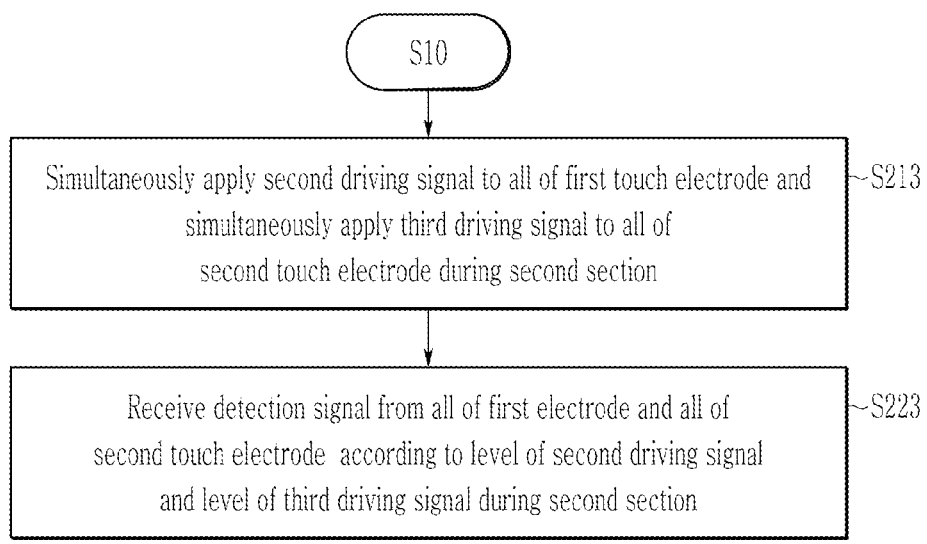
FIG. 14 is a flowchart of a touch detection method according to a fourth aspect.
Figure 15:
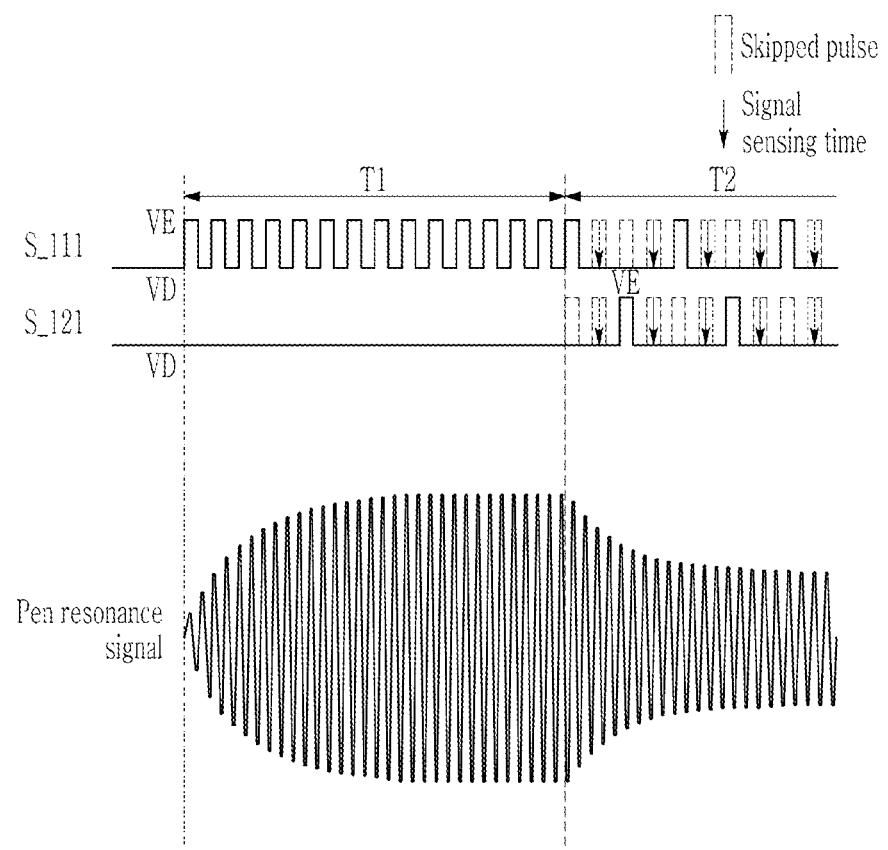
FIG. 15 is a waveform diagram of a driving signal and a pen resonance signal according to the touch detection method of FIG. 14.

FIG. 14 is a flowchart of a touch detection method according to a fourth aspect, and FIG. 15 is a waveform diagram of a driving signal and a pen resonance signal according to the touch detection method of FIG. 14.

Referring to FIG. 14, during the second section T2, the first driver 110 applies the second driving signal S_111 to all of the plurality of first touch electrodes 111-1 to 111-n, and the second driver 120 applies the third driving signal S_121 to all of the plurality of second touch electrodes 121-1 to 121-m (S213). A resonance signal of the stylus pen 20 can be maintained with an effective level by the second driving signal S_111 and the third driving signal S121 in the second section T2.

As shown in FIG. 15, during the second section T2, the second driving signal S_111 is applied to all of the plurality of first touch electrodes 111-1 to 111-n, and the third driving signal S_121 is applied to all of the plurality of second touch electrodes 121-1 to 121-m. Pulses of the enable level VE are alternately applied to all of the plurality of first touch electrodes 111-1 to 111-n and the plurality of second touch electrodes 121-1 to 121-m.

During the second section T2, the second driver 120 simultaneously receives the detection signals from all of the plurality of the first touch electrodes 111-1 to 111-n and the plurality of second touch electrodes 121-1 to 121-m for a period during which the pulse of the second driving signal S_111 is skipped, and the first driver 110 simultaneously receives the detection signals from all of the plurality of first touch electrodes 111-1 to 111-n and the plurality of second touch electrodes 121-1 to 121-m for a period during which the pulse of the third driving signal S_121 is skipped (S223). That is, while the second driving signal applied to the plurality of first touch electrodes 111-1 to 111-n has the disable level and the third driving signal applied to the plurality of second touch electrodes 121-1 to 121-m has the disable level, the first and second drivers 110 and 120 can simultaneously receive the detection signals from all of the plurality of first touch electrodes 111-1 to 111-n and the plurality of second touch electrodes 121-1 to 121-m.

The detection signals can be received from all of the plurality of first touch electrodes 111-1 to 111-n and the plurality of second touch electrodes 121-1 to 121-*m* during a period before the third driving signal S_121 having the enable level VE is applied to the plurality of second touch electrodes 121-1 to 121-*m* after the second driving signal S_111 having the enable level VE is applied to the plurality of first touch electrodes 111-1 to 111-*n* and a period before the second driving signal S_111 having the enable level VE is applied to the plurality of first touch electrodes 111-1 to 111-*n* after the third driving signal S_121 having the enable level VE is applied to the plurality of second touch electrodes 121-1 to 121-*m*.

The touch apparatus 10 and the touch detection method according to the fourth aspect have a merit of quickly acquiring touch coordinates along two axes that cross each other because the detection signals can be received through all of the plurality of first touch electrodes 111-1 to 111-*n* and the plurality of second touch electrodes 121-1 to 121-*m* in the second section T2.

Figure 16:
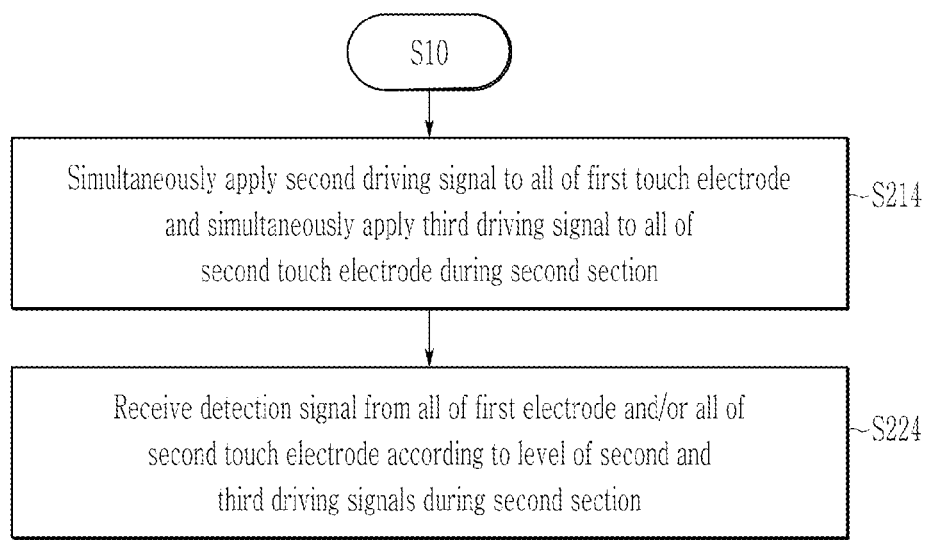
FIG. 16 is a flowchart of a touch detection method according to a fifth aspect.

FIG. 16 is a flowchart of a touch detection method according to a fifth aspect, and FIG. 17 and FIG. 18 are waveform diagrams of a driving signal and a pen resonance signal according to the touch detection method of FIG. 16.

Referring to FIG. 16, during the second section T2, the first driver 110 applies the second driving signal S_111 to all of the plurality of first touch electrodes 111-1 to 111-*n*, and at the same time, the second driver 120 applies the third driving signal S_121 to all of the plurality of second touch electrodes 121-1 to 121-*m* (S214). A resonance signal of the stylus pen 20 can be maintained with an effective level by the second driving signal S_111 and the third driving signal S121 in the second section T2.

As shown in FIG. 17 and FIG. 18, during the second section T2, the second driving signal S_111 is applied to all of the plurality of first touch electrodes 111-1 to 111-*n* and the third driving signal S_121 is applied to all of the plurality of second touch electrodes 121-1 to 121-*m*. The second driving signal S_111 and the third driving signal S_121 may be signals of the same phase. When the second driving signal S_111 having the enable level VE is applied to all of the plurality of first touch electrodes 111-1 to 111-*n*, the third driving signal S_121 having the enable level VE is applied to all of the plurality of second touch electrodes 121-1 to 121-*m*.

Referring to FIG. 16, during the second section T2, the second driver 120 receives the detection signal from the plurality of second touch electrodes 121-1 to 121-*m* for a plurality of first periods during which the pulses of the second and third driving signals S_111 and S_1212 are skipped, and then, at least one of the first driver 110 and the second driver 120 receives the detection signal from at least one type of touch electrodes among the plurality of first touch electrodes 111-1 to 111-*n* and the plurality of second touch electrodes 121-1 to 121-*m* for a plurality of second periods during which the pulses of the second and third driving signals S_111 and S_121 are skipped (S224).

For example, as shown in FIG. 17, while the second driving signal applied to the plurality of first touch electrodes 111-1 to 111-*n* has the disable level and the third driving signal applied to the plurality of second touch electrodes 121-1 to 121-*m* has the disable level, the second driver 120 can receive the detection signals from all of the plurality of second touch electrodes 121-1 to 121-*m*. While the second driving signal applied to the next plurality of first touch electrodes 111-1 to 111-*n* has the disable level and the third driving signal applied to the plurality of second touch electrodes 121-1 to 121-*m* has the disable level, the first driver 110 may receive the detection signal from all of the plurality of first touch electrodes 111-1 to 111-*n*.

As another example, as shown in FIG. 18, while the second driving signal applied to the plurality of first touch electrodes 111-1 to 111-*n* has the disable level and the third driving signal applied to the plurality of second touch electrodes 121-1 to 121-*m* has the disable level, the first and second drivers 110 and 120 may simultaneously receive the detection signal from all of the plurality of first touch electrodes 111-1 to 111-*n* and the plurality of second touch electrodes 121-1 to 121-*m*.

The touch apparatus 10 and the touch detection method according to the fifth aspect have a merit of quickly acquiring touch coordinates along two axes that cross each other because the detection signals can be received through all of the plurality of first touch electrodes 111-1 to 111-*n* and the plurality of second touch electrodes 121-1 to 121-*m* in the second section T2.

Figure 19:
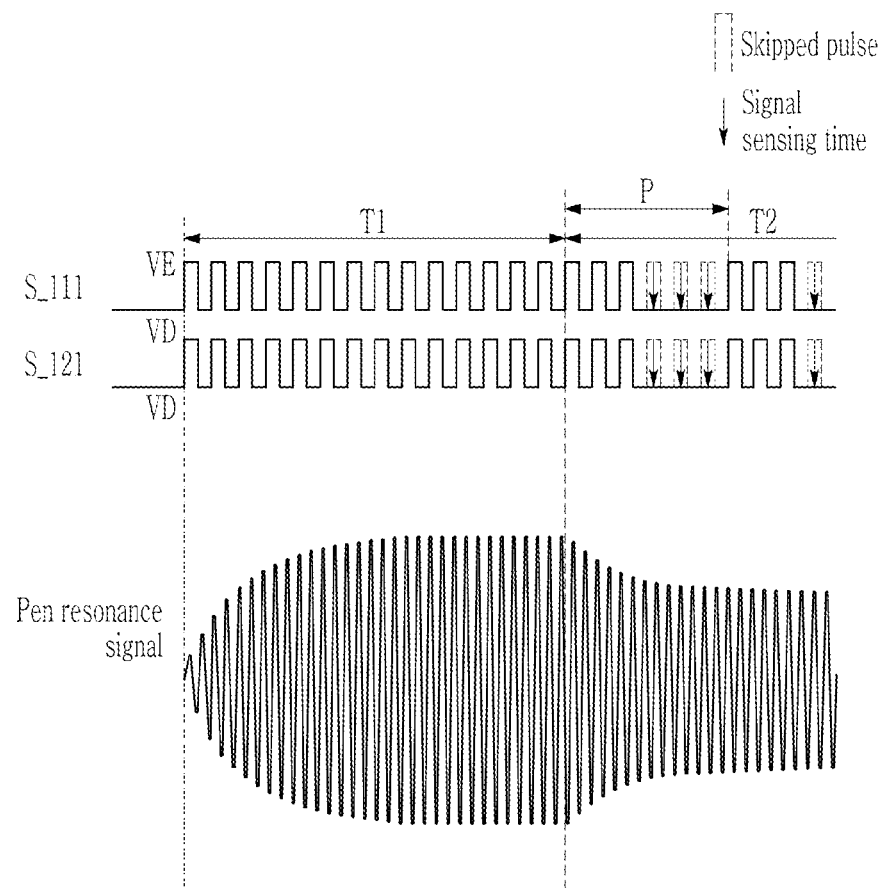
FIG. 19 is a waveform diagram of a driving signal and a pen resonance signal according to an exemplary embodiment.

FIG. 19 is a waveform diagram of a driving signal and a pen resonance signal according to an exemplary embodiment.

Referring to FIG. 19, during a second section T2, a second driving signal S_111 may be applied to all of a plurality of first touch electrodes 111-1 to 111-*n* and a third driving signal S_121 may be applied to all of a plurality of second touch electrodes 121-1 to 121-*m*. The second driving signal S_111 and the third driving signal S_121 may be signals of the same phase.

A period that corresponds to one period P of the second driving signal S_111 and the third driving signal S_121 may include a section during which an enable level section and a disable level section repeat at least n times (n=3 in FIG. 19, but this is not restrictive), and a section during which a disable level section is maintained at least 2n times.

While the second driving signal applied to the plurality of first touch electrodes 111-1 to 111-*n* has the disable level and the third driving signal applied to the plurality of second touch electrodes 121-1 to 121-*m* has the disable level, the first and second drivers 110 and 120 may simultaneously receive detection signals from all of the plurality of first touch electrodes 111-1 to 111-*n* and the plurality of second touch electrodes 121-1 to 121-*m*.

In the description of FIG. 8 to FIG. 19, the receiving of the detection signal may be performed at least one time in the second section T2 by at least one of the first driver 110 and the second driver 120. In addition, a time at which the detection signal is received may be one of times (signal sensing times) respectively illustrated in FIG. 9, FIG. 11, FIG. 13, FIG. 15, FIG. 17, FIG. 18, and FIG. 19, and may further include an arbitrary time in the second section T2, which is not illustrated in FIG. 9, FIG. 11, FIG. 13, FIG. 15, FIG. 17, FIG. 18, and FIG. 19. For example, in FIG. 19, the detection signal receiving time by the first driver 110 and the second driver 120 may be one time directly before termination of one period P.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A touch apparatus comprising:
    a touch panel that includes a plurality of first touch electrodes extending in a first direction and arranged in a second direction that crosses the first direction, and a plurality of second touch electrodes extending in the second direction and arranged in the first direction; and a touch driver that applies a first driving signal for generation of a resonance signal of a stylus pen to the touch panel in a first section, and receives a detection signal from the plurality of first touch electrodes and the plurality of second touch electrodes in a second section that is next to the first section, wherein the touch driver applies, in the second section, a driving signal of which a ratio of a disable level section with respect to an enable level section within one iterative period is different from that of the first driving signal, to at least one type of the plurality of first touch electrodes and the plurality of second touch electrodes.

2. The touch apparatus of claim 1, wherein the touch driver receives the detection signal when the driving signal applied to the at least one type of the plurality of first touch electrodes and the plurality of second touch electrodes is in the disable level section in the second section.

3. The touch apparatus of claim 1, wherein the touch driver receives detection signals from the plurality of second touch electrodes when a driving signal applied to the plurality of first touch electrodes has a disable level in the second section, and receives detection signals from the plurality of first touch electrodes when a driving signal applied to the plurality of second touch electrodes has a disable level in the second section.

4. The touch apparatus of claim 3, wherein the touch driver receives detection signals from the plurality of second touch electrodes when the driving signal has the disable level for a 2-1 section during which the driving signal is applied only to the plurality of first touch electrodes in the second section, and receives detection signals from the plurality of second touch electrodes when the driving signal has the disable level for a 2-2 section during which the driving signal is applied only to the plurality of second touch electrodes in the second section.

5. The touch apparatus of claim 1, wherein the touch driver receives detection signals from the plurality of first touch electrodes and the plurality of second touch electrodes when the driving signal applied to the plurality of first touch electrodes has the disable level in the second section, and receives detection signals from the plurality of first touch electrodes and the plurality of second touch electrodes when the driving signal applied to the plurality of touch signals has the disable level in the second section.

6. The touch apparatus of claim 5, wherein the touch driver receives detection signals from the plurality of first touch electrodes and the plurality of second touch electrodes when the driving signal has the disable level for a 2-1 section during which the driving signal is applied only to the plurality of first touch electrodes in the second section, and receives detection signals from the plurality of first touch electrodes and the plurality of second touch electrodes when the driving signal has the disable level for a 2-2 section in which the driving signal is applied only to the plurality of second touch electrodes in the second section.

7. The touch apparatus of claim 1, wherein the touch driver alternately applies the driving signal having the enable level to the plurality of first touch electrodes and the plurality of second touch electrodes in the second section, and receives detection signals from at least one type of touch electrodes among the plurality of first touch electrodes and the plurality of second touch electrodes for a period before the driving signal having the enable level is applied to the plurality of second touch electrodes after the driving signal of the enable level is applied to the plurality of first touch electrodes and for a period before the driving signal of the enable level is applied to the plurality of first touch electrodes after the driving signal of the enable level is applied to the plurality of second touch electrodes.

8. The touch apparatus of claim 1, wherein the touch driver receives detection signals from at least one type of touch electrodes among the plurality of first touch electrodes and the plurality of second touch electrodes when driving signals having the same phase are applied to the plurality of first touch electrodes and the plurality of second touch electrodes and the driving signals have the disable level in the second section.

9. The touch apparatus of claim 1, wherein a ratio of a disable level section with respect to an enable level section within one repeating period of the driving signal applied to the at least one type of touch electrodes among the plurality of first touch electrodes and the plurality of second touch electrodes in the second section comprises at least one of a:2b+1, a:2b+2, a:2b+3, a:2b+4, a:3b+1, a:2 b+3+1, a:2 b+3, and a:2b+1, where a and b are integers.

10. The touch apparatus of claim 1, wherein the touch driver applies the first driving signal to at least one type of the plurality of first touch electrodes and the plurality of second touch electrodes in the first section.

11. The touch apparatus of claim 1, further comprising a controller that acquires touch coordinate information by using a detection signal received during the second section by the touch driver.

12. The touch apparatus of claim 11, wherein the controller determines a type of a touch object by using a detection signal received during the second section by the touch driver.

13. The touch apparatus of claim 1, wherein the touch driver comprises a first driver that is connected to the plurality of first touch electrodes and a second driver that is connected to the plurality of second touch electrodes, and the first driver comprises a differential amplifier connected to two first touch electrodes and an ADC that converts a differentially amplified signal to a digital signal.

14. The touch apparatus of claim 13, wherein the two first touch electrodes are separated from each other while disposing at least one first touch electrode therebetween.

15. A touch apparatus comprising:

a touch panel that includes a plurality of first touch electrodes extending in a first direction and arranged in a second direction that crosses the first direction, and a plurality of second touch electrodes extending in the second direction and arranged in the first direction;

a touch driver that applies a first driving signal for generation of a resonance signal of a stylus pen to the plurality of first touch electrodes and the plurality of second touch electrodes in a first section, and applies a second driving signal to the plurality of first touch electrodes and the plurality of second touch electrodes within one repeating period in a second section, which is next to the first section, wherein the second driving signal has a ratio of a disable level section with respect to an enable level section that is different from a ratio of the first driving signal, and the touch driver receives detection signals from the plurality of first touch electrodes and the plurality of second touch electrodes when the second driving signal has a disable level during the second section; and a controller that acquires touch coordinate information by using the detection signal received during the second section, and determines a type of a touch object.

16. The touch apparatus of claim 15, wherein one period of the second driving signal comprises a section during which an enable level section and a disable level section repeat at least a times, and a section during which the disable level section is maintained at least 2a times.

17. A touch detection method comprising:
in a first section, applying a first driving signal for generation of a resonance signal of a stylus pen to a touch panel that includes a plurality of first touch electrodes extending in a first direction and arranged in a second direction that crosses the first direction, and a plurality of second touch electrodes extending in the second direction and arranged in the first direction;
receiving detection signals from the plurality of first touch electrodes and the plurality of second touch electrodes in a second section, which is next to the first section;
acquiring touch coordinate information from the detection signal; and
in a second section next to the first section, applying a driving signal of which a ratio of a disable level section with respect to an enable level section is different from that of the first driving signal within one repeating period, to at least one type of the plurality of first touch electrodes and the plurality of second touch electrodes.

18. The touch detection method of claim 17, wherein
a ratio of the disable level section with respect to the enable level section within one repeating period of the driving signal applied to the at least one type of touch electrodes among the plurality of first touch electrodes and the plurality of second touch electrodes in the second section comprises at least one of a:2b+1, a:2b+2, a:2b+3, a:2b+4, a:3b+1, a:2 b+3+1, a:2 b+3, and a:2b+1, where a and b are integers.

* * * * *